(12) United States Patent
Agee et al.

(10) Patent No.: US 7,287,777 B2
(45) Date of Patent: Oct. 30, 2007

(54) COLLAPSIBLE HAND-OPERATED HAULING DEVICE

(75) Inventors: Jace Agee, Spring Creek, NV (US); Ruth Agee, Spring Creek, NV (US)

(73) Assignee: A.G. Products, Inc., Spring Creek, NV (US)

( * ) Notice: Subject to any disclaimer, the term of this patent is extended or adjusted under 35 U.S.C. 154(b) by 239 days.

(21) Appl. No.: 10/757,140

(22) Filed: Jan. 13, 2004

(65) Prior Publication Data
US 2004/0183264 A1 Sep. 23, 2004

Related U.S. Application Data

(60) Provisional application No. 60/439,670, filed on Jan. 13, 2003.

(51) Int. Cl.
*B62B 1/20* (2006.01)
(52) U.S. Cl. ........................................ 280/652; 280/655
(58) Field of Classification Search ................ 280/1.5, 280/35, 40, 42, 655, 655.1, 639, 641, 645, 280/651, 652, 659
See application file for complete search history.

(56) References Cited

U.S. PATENT DOCUMENTS

| | | | | |
|---|---|---|---|---|
| 3,035,847 A | * | 5/1962 | Born | 280/654 |
| 3,305,243 A | * | 2/1967 | Manfredi, Jr. et al. | 280/651 |
| 4,637,626 A | * | 1/1987 | Foss et al. | 280/655 |
| 5,179,746 A | * | 1/1993 | Rogers | 5/625 |
| 5,215,318 A | * | 6/1993 | Capraro | 280/1.5 |
| 5,577,744 A | * | 11/1996 | Parks | 280/32.6 |
| 5,915,723 A | * | 6/1999 | Austin | 280/651 |
| 6,059,298 A | * | 5/2000 | Tucker | 280/32.6 |

\* cited by examiner

*Primary Examiner*—Frank Vanaman
(74) *Attorney, Agent, or Firm*—Morriss O'Bryant Compagni

(57) ABSTRACT

A collapsible hand-operated hauling device is structured of sturdy, yet lightweight material for hauling matter, and is structured to be collapsed or folded into a smaller size so that the hauling device can be lifted and stored, on a wall for example, or placed in a car trunk or truck bed for transport, for example. The collapsible hand-operated hauling device generally comprises a bed, having sections that fold together, at least one handle and a wheel assembly.

8 Claims, 4 Drawing Sheets

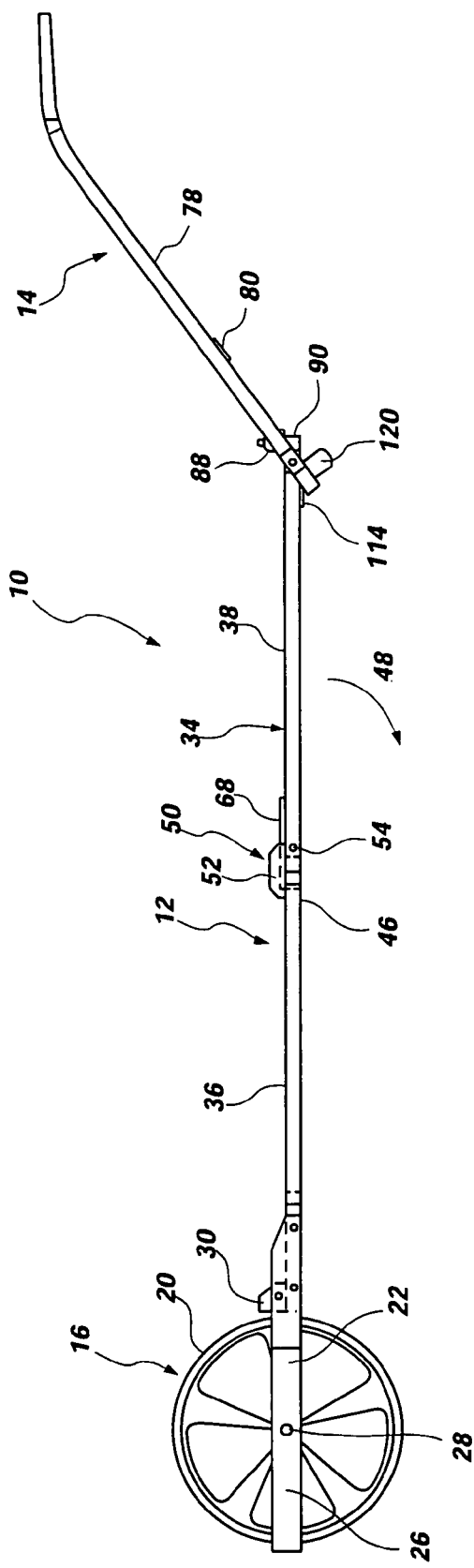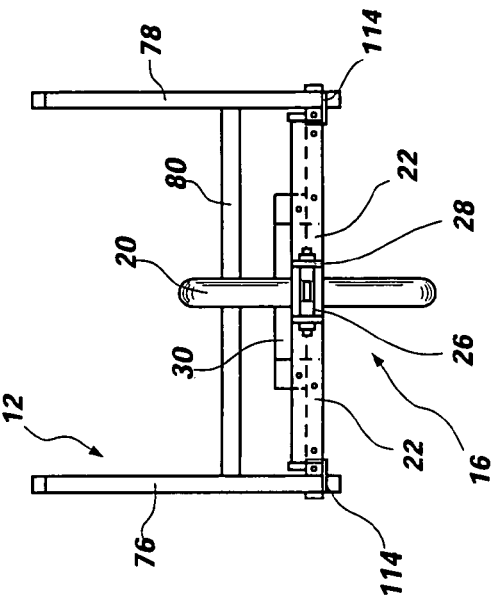
FIG. 1
FIG. 2

COLLAPSIBLE HAND-OPERATED HAULING DEVICE

CROSS-REFERENCE TO RELATED APPLICATION

This application is a non-provisional application claiming priority to provisional patent application Ser. No. 60/439,670 filed Jan. 13, 2003.

BACKGROUND OF THE INVENTION

1. Field of the Invention

This invention relates to hand-operated devices for transporting or hauling items, such as agricultural materials, and specifically relates to a hand-operated hauling device which is structured to be collapsible for ease of transport and storage.

2. Description of Related Art

Many devices have been developed for transporting or moving materials or items by hand, particularly for moving items in the yard or garden, or in more agricultural-type settings. Such hand-operated devices include wheelbarrows, bale-movers and other wheeled carts. The benefits of such devices is well-known; namely, they allow a person to transport or haul otherwise heavy materials or objects without straining muscles and without having to employ larger equipment.

However, known hand-operated hauling devices are conventionally constructed of heavy materials, such as steel, and/or are large and bulky in construction to render the device particularly suitable for transporting heavy materials like sod or dirt. Consequently, it is difficult to store such bulky hauling devices in a shed or garage when not in use, and it is difficult to pick up such devices to, for example, hang on a hook for out-of-the-way storage. It is additionally difficult to pick up such bulky devices for placing them in a car trunk or truck bed for transporting the hauling device to a new location.

Therefore, it would be advantageous in the art to provide a hand-operated hauling device which is constructed to be sturdy for use in hauling heavy materials or items, but which is also structured to be sufficiently lightweight to be transportable when not in use and which is structured to be easily stored out of the way.

BRIEF SUMMARY OF THE INVENTION

In accordance with the present invention, a hand-operated hauling device is provided which is structured to be collapsible so that the device may be folded up for convenient transport and storage. Further in accordance with the present invention, the hand-operated hauling device is made of relatively lightweight material, rendering the device easy to lift and transport while still rendering the device strong enough to support and transport heavy items not otherwise easily transported by human hand.

The collapsible hauling device of the present invention generally comprises a hauling bed, at least one handle and a wheel assembly. The wheel assembly is attached to the bed, generally at one end thereof, and the handle is positioned generally at the opposite end of the bed.

The bed of the device is comprised of at least two bed sections which fold or collapse relative to each other so that the hauling device can be made smaller for storage and transporting. The sections of the bed are pivotally or otherwise attached to enable the sections to be folded together. A positioning device, such as a locking or stop device, secures the sections in selected position when the hauling device is in a non-collapsed, or use-mode, state. The bed, and each section, may preferably be made of a sturdy, yet lightweight material that allows the device to hold and haul a considerable load, but also allows the collapsed device to be easily lifted, transported and stored. The bed may include a peripheral frame of strong material to provide the bed with added stability and strength.

At least one handle is pivotally attached to the bed at the end opposite the wheel assembly. A locking device is positioned with respect to the handle so that the handle may be moved from a collapsed state (for storage or transport of the device) to a non-collapsed or use-mode state and retained in position for use of the device. The same, or an additional, locking device is structured and positioned to ensure that the handle, when in the collapsed state of the device, is retained in position in the folded or collapsed state of the device. The handle may also be provided with a positioning device that enables selected positioning of the handle relative to the bed when in the non-collapsed state. The locking device may be structured to also provide selected height-positioning of the handle in use of the hauling device.

The collapsible hauling device of the present invention further includes auxiliary handles that enable the device, when in the collapsed stated, to be lifted with one hand. One or more such auxiliary handles may be provided and may, preferably, be positioned such that the collapsed hauling device can be lifted at one end (e.g., opposite the wheel assembly) or on one or the either side of the device.

These and other features of the invention will be made clear in the following description of but one exemplary embodiment of the invention.

BRIEF DESCRIPTION OF THE SEVERAL VIEWS OF THE DRAWINGS

In the drawings, which illustrate what is currently considered to be the best mode for carrying out the present invention:

FIG. 1 is a side view in elevation of the collapsible hauling device of the present invention;

FIG. 2 is a front view in elevation of the device shown in FIG. 1;

DETAILED DESCRIPTION OF THE INVENTION

Figure 3:
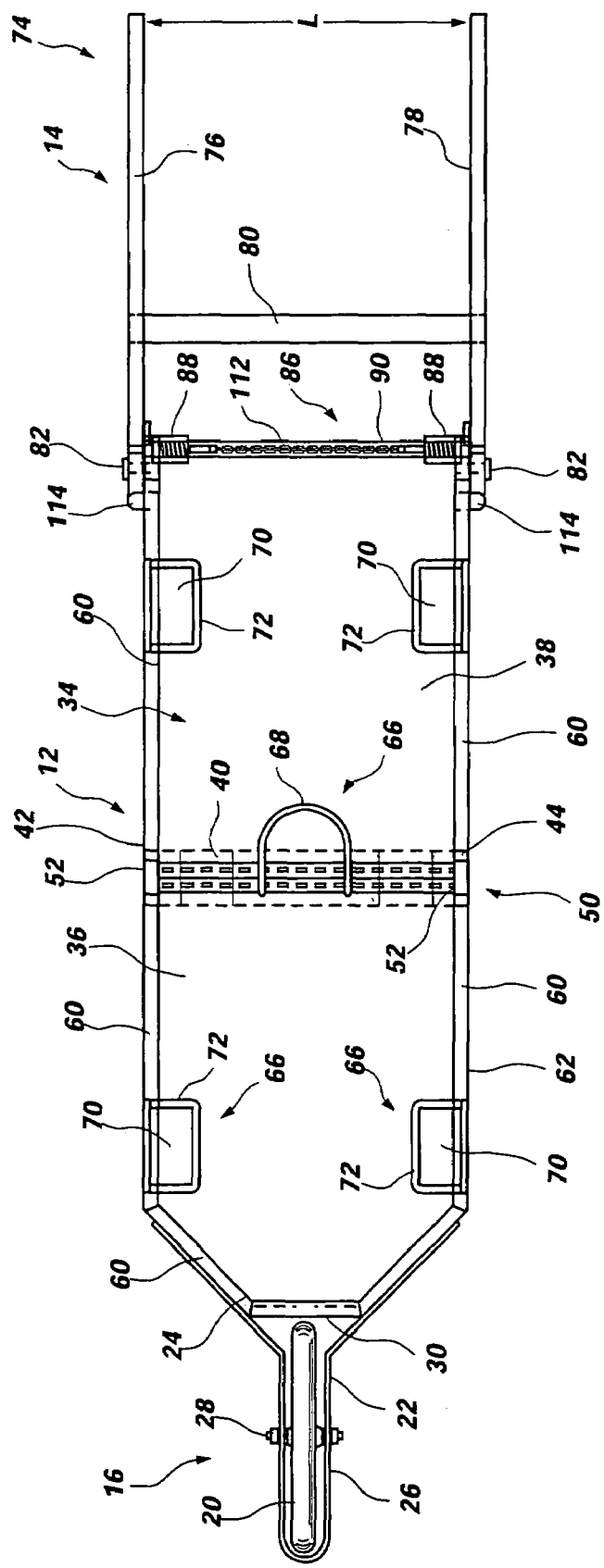
FIG. 3 is a plan view of the device shown in FIG. 1.

The collapsible hand-operated hauling device 10 of the present invention is shown in FIGS. 1-3. In FIG. 1, the hauling device 10 is illustrated in a non-collapsed state, ready for use in hauling items. The hauling device 10 is generally comprised of a bed 12, at least one handle 14 and a wheel assembly 16. The wheel assembly 16 is generally positioned at one end of the bed 12 and the handle 14 is secured to the bed 12 at an end opposite the wheel assembly 16.

The wheel assembly 16 generally comprises at least one wheel 20 which is secured in some fashion to the bed 12. As shown in FIGS. 1-3, one exemplary means of connecting the wheel 20 to the bed 12 is to provide a forked wheel frame 22 which connects to the front end 24 of the bed 12. The wheel frame 22 has a forward extending elongated U-shaped portion 26, having parallel sides, sized to receive a wheel 20 therebetween. An axle 28 is positioned through the parallel sides of the U-shaped portion 26 and through the wheel 20 to attach the wheel 20 to the wheel frame 22.

As best shown in FIGS. 2 and 3, an upstanding fender 30 may be positioned between the wheel 20 and the bed 12 to provide a barrier between the wheel 20 and items being carried on the bed 12. The upstanding fender 30 may be attached either as a part of the wheel frame 22 or may be attached as a separate structure to the front end 24 of the bed 12. Although only one wheel 20 is shown in the exemplar embodiment, more than one wheel may be provided in a wheel assembly, or multiple wheel assemblies of suitable size and construction may be used.

The top surface 34 of the bed 12 of the hauling device 10 is generally flat, but may be variable in surface shape, as long as the sections of the bed 12 can be collapsed or folded together consistent with the objective of the invention. In the embodiment illustrated herein, the bed 12 is comprised of two sections, which may be designated as the front section 36 and the rear section 38. The two sections 36, 38 are arranged adjacent each other and are connected together in a manner that allows the two sections 36, 38 to collapse or be folded together for transport and storage.

By way of example only, the front section 36 and rear section 38 of the illustrated bed 12 are joined together, as shown, with a piano hinge 40 that extends from one lateral side 42 of the bed 12 to the other lateral side 44 of the bed 12. The hinge 40 is positioned on the lower surface 46 of the bed 12 to allow the rear section 38 to be rotated in the direction of arrow 48 for folding. In an alternative embodiment, however, the hinge 40 may be positioned on the top surface 36 to allow the rear section 38 to fold over the front section 36 in the other direction.

A positioning mechanism 50 is preferably provided which contacts adjoining sections of the bed 12 to maintain the sections in a deployed or non-collapsed state, ready to receive and haul items on the bed 12. Thus, for example, at least one stop plate 52 may be positioned to contact both sections 36, 38 of the bed 12 to prevent the two sections 36, 38 from over rotating relative to each other when the hauling device 10 is in a non-collapsed or deployed state. As seen more clearly in FIG. 3, two stop plates 52 are provided, one at either lateral side 42, 44 of the bed 12 and positioned to extend between the sections 36, 38 of the bed 12.

As illustrated in FIG. 1, the stop plates 52 are secured to the side of the rear section 38 by, for example, a bolt 54, or other suitable means. As will be illustrated further hereinafter, the stop plates 52 are not connected to, but merely contact the top surface 34 of the front section 36 to allow the rear section 38 to rotate relative to the front section 36 for storage. The stop plates 52 are preferably made of very strong stainless steel or equally strong material which helps to stabilize and position the sections 36, 38 when a heavy load is being carried on the hauling device 10.

The sections 36, 38 of the bed 12 are preferably made of a lightweight and durable material which is strong enough to retain materials or items on the bed 12 while not making the hauling device 10 too heavy to lift, in a collapsed state, by an average adult. Such materials may include lightweight woods, metals and plastics, and may include woven natural or synthetic fabrics such as canvas. It may be further desirable, or even necessary when using fabric material for the bed 12, to construct the hauling device 10 with a bed frame 60 which encircles the perimeter 62 of the bed 12, or a substantial portion thereof. The bed frame 60 may be made of any suitably strong and durable material, and may include wood, metal, plastic or combinations of those materials. It is additionally preferred that the material of the bed frame 60 be selected from a class or group of materials that would not add excessive additional weight to the device.

As best seen in FIG. 3, the hauling device 10 may be structured with one or more auxiliary handles 66 which enable the hauling device 10 to be lifted in its collapsed state for transporting and storage. For example, the hauling device 10 may be structured with a bail handle 68 that is secured to the top surface 34 of one of the sections 36, 38 of the bed 12. As illustrated by way of example only, the bail handle 68 is secured to the front section 36 in proximity to the adjacent edges of the two sections 36, 38 and may be attached by any suitable means, including bolting or welding the bail handle 68 to the top surface 34 of the front section 36. As will become clear hereinafter, the bail handle 68 is only attached to one section 36, 38 of the bed 12 so the that two sections 36, 38 may be collapsed or folded relative to each other, leaving the bail handle 68 extending outwardly for grasping.

The hauling device 10 may further be structured with one or more side handles 70 that enable the user to lift the hauling device 10 from one or the other side of the device 10 when the hauling device 10 is in a collapsed or folded state. The side handles 70 may be any suitable structure and, for example, may be bail handles, similar to the bail handle 68 previously described, that are attached to the bed frame 60 and extend outwardly therefrom. However, as illustrated by further example, the side handles 70 are provided by an opening formed in the bed 12 of device which may be surrounded by a flashing liner 72 that surrounds the opening, including the bed frame 60. Thus, the bed frame 60 in the area adjacent the opening formed in the bed 12 becomes the graspable element of the side handles 70. Notably, as shown in FIG. 3, side handles 70 are provided by openings in both the front section 36 and rear section 38 and the openings overlay each other to allow the user to place his hand through both openings when the two bed sections 36, 38 are folded upon each other. However, side handles 70 need only be provided in one of the sections 36, 38 of the bed 12.

The hauling device 10 of the present invention has at least one handle 14 attached to the bed 12 and positioned to operate the hauling device for carrying loads. The handle 14 may be of any suitable design, one exemplary design being illustrated in the drawing figures. As best illustrated in FIG. 3, the handle 14 may comprise a handle assembly 74 that comprises a right handle 76 and a left handle 78 that are connected together by a rail 80. Both the right handle 76 and the left handle 78 are pivotally connected to the bed 12 of the hauling device 10 by a pivoting mechanism 82, as shown in FIG. 5.

Thus, the handles 76, 78, connected together by the rail 80, are rotatable in tandem about the respective pivoting mechanisms 82 which connect each handle to the bed 12 (and to the bed frame 60 when present) to allow the handle 14 to fold against the bed 12 when in a collapsed state. It can be seen from FIG. 3 that the distance L between the right handle 76 and left handle 78 is greater than the width dimension of the bed 12, thereby enabling the handle 14 to be folded against the bed 12, as illustrated further in FIG. 6.

Figure 5:
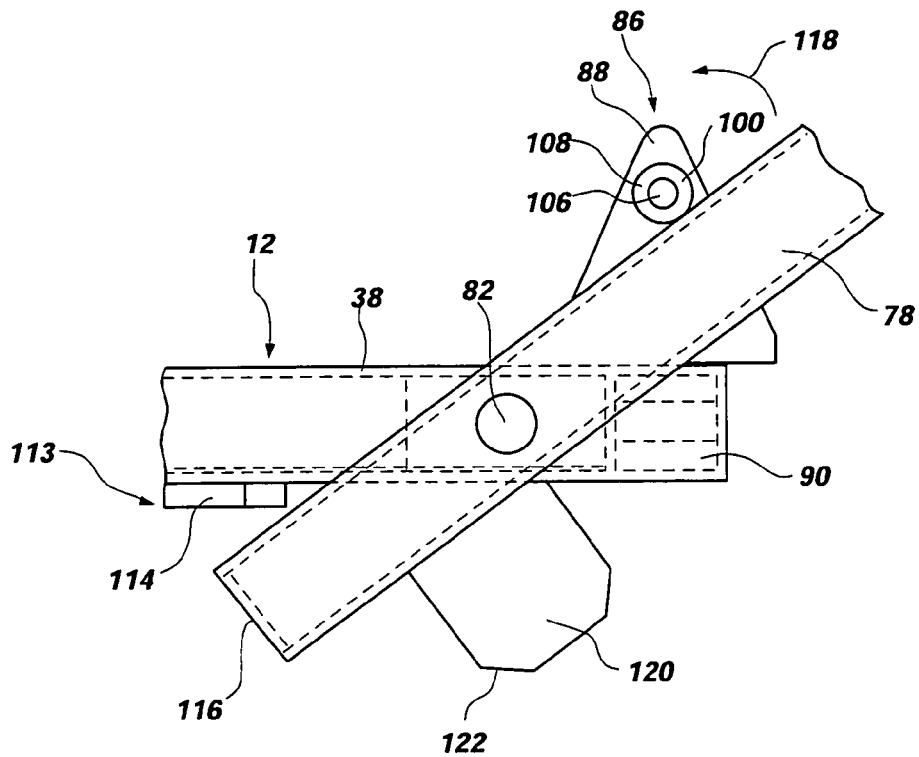
FIG. 5 is an enlarged view in elevation of the illustrated locking device of the handle.

As shown best in FIGS. 3-5, the handle 14 is structured with at least one locking mechanism 86 which retains the handle 14 in position for operation of the hauling device 10 when in a deployed or non-collapsed state. While a second locking mechanism may be provided which retains the handle 14 in a folded position against the bed 12 when the hauling device 10 is in a folded or collapsed state, the locking mechanism 86 illustrated here provides locking retention of the handle 14 in its appropriate position in both a deployed and a folded state of the hauling device 10.

Figure 4B:
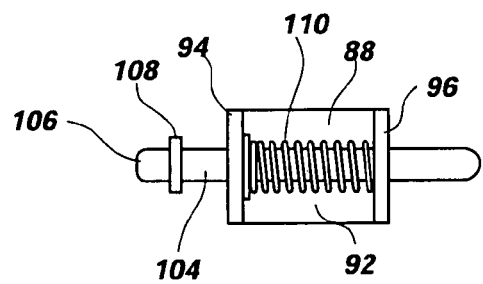
FIG. 4B is a plan view of the latch bracket shown in FIG. 4A.
Figure 4A:
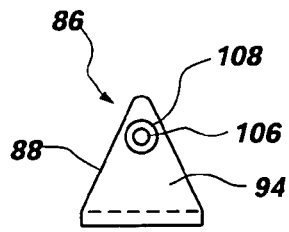
FIG. 4A is an end view in elevation of a latch bracket used to position the handle of the device.
Figure 4C:
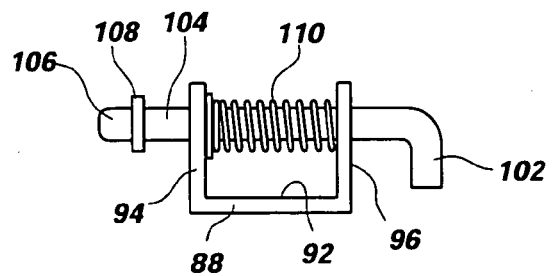
FIG. 4C is a side view in elevation of the latch bracket shown in FIG. 4B.

Specifically, the locking mechanism 86 that is illustrated, by way of example only, comprises two saddle brackets 88 that are positioned at either lateral side 42, 44 of the bed 12 in proximity to the rear edge 90 of the bed 12. The detail of the saddle brackets 88 is further shown in FIGS. 4A, 4B, 4C and 5. As illustrated in FIGS. 4A, 4B and 4C, the saddle brackets 88 of the locking mechanism 86 have a base plate 92 that contacts the top surface 34 of the bed 12 and two parallel upstanding sides 94, 96 through which an elbow pin 100 is journalled. The elbow pin 100 is structured with an arm 102 that extends perpendicularly from the straight shaft 104 of the pin 100, which is slidingly received through the saddle bracket 88. At the terminal end 106 of the pin shaft 104 is a stop washer 108 integrally formed with or welded to the pin shaft 104. The elbow pin 100 may extend through a spring 110 biased between the upstanding sides 94, 96 of the saddle bracket 88.

Referring again to FIG. 3, it can be seen that a chain 112 is connected at either end to the respective arms 102 of the elbow pins 100 of the two-spaced apart saddle brackets 88. Though not shown in detail, the chain 112 is secured to the respective arms 102 in a manner to assure that the chain does not slip from the arms 102. When the hauling device 10 and handle 14 are in a deployed state ready for use, as shown in FIG. 5, the handle 14 (here showing just the left handle 78, but applicable to the right handle 76 as well) strikes or contacts the elbow pin 100 which, as shown in FIGS. 4B and 4C, extends beyond the saddle bracket 88. Thus, the elbow pin 100 contacts the handle 14 and keeps the handle 14 from rotating relative to the bed 12 during use.

Additionally, the hauling device 10 may be provided with a handle positioning mechanism 113 structured to position the handle 14 is a normal operating position when the hauling device 10 is in a deployed state. As one exemplar structure, the handle positioning mechanism 113 may be at least one bumper plate 114 that is attached to the bed 12 or bed frame 60 and extends laterally outward, as best seen in FIG. 3, to contact the lower terminal end 116 of each of the right handle 76 and left handle 78, again as best seen in FIG. 5. The bumper plates 114 also prevent the handle 14 from over-rotating in a clockwise position as seen in FIG. 5.

When the hauling device 10 is to be collapsed and folded for storage, the locking mechanism 86 is deactivated by pulling on the chain 112 or otherwise shortening the length of the chain 112 to thereby pull inwardly on the elbow pins 100. As the elbow pins 100 are moved inwardly by the chain 112, the terminal ends 106 of the elbow pins 100 are moved inwardly such that they no longer contact the handles 76, 78 and the handles 76, 78 are able to rotate, in the direction of arrow 118, to fold over the bed 12 of the hauling device 10.

While the position of the rail 80 between the right handle 76 and left handle 78 aids in maintaining the handle 14 in a folded position against the bed 12, the handle 14, and specifically both the right handle 76 and left handle 78, may be structured with a lock plate 120 which extends from each handle 76, 78 near the terminal end 116 thereof. The lock plate 120 is configured and positioned so that as the handle 14 rotates in direction 118 and comes to rest against the bed 12 in its folded state (FIG. 6), and as the chain 112 is released, thereby allowing the elbow pins 100 to move laterally outwardly, the terminal end 106 of each elbow pin 100 contacts the outer edge 122 of the lock plate 120, thereby locking the handle 14 into a folded position, as seen in FIG. 6.

Figure 6:
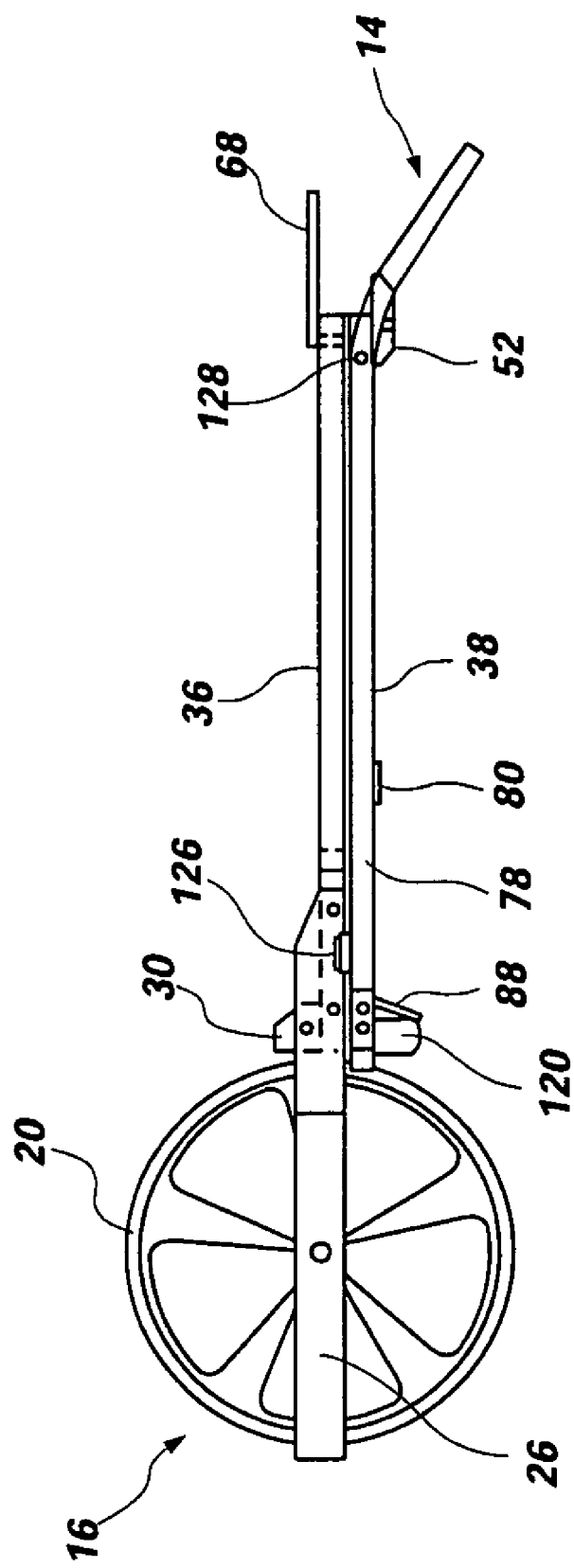
FIG. 6 is a side view in elevation of the collapsible hauling device of the present invention in a collapsed or folded state.

FIG. 6 illustrates the hauling device 10 of the present invention in its collapsed or folded state. It can be seen that the rear section 38 of the bed 12 has been rotated (clockwise) about the piano hinge (not shown) so that the rear section 38 is folded adjacent the front section 36. Consequently, the bail handle 68 extends outwardly from the front section 36 to provide means for lifting the hauling device 10. It can also be seen that the stop plate 52, connected to the rear section 38, is rotated away from contact with the front section 36 of the bed 12.

It can also be seen that the handle 14 is folded back upon the rear section 38 as previously described. The hauling device 10 may optionally include a further locking mechanism 126, comprising a simple latch or other suitable device, which secures the rear section 38 to the front section 36 of the hauling device 10 when in a collapsed state. The hauling device 10 may further optionally include another locking device 128, such as a detent pin or other suitable means, for securing the handle 14 to the rear section 38 near the piano hinge (not shown). It may be noted that the user may also use the bail handle 68 to pull the collapsed hauling device 10 along the ground as the wheel 20 rotates.

The collapsible hauling device of the present invention is structured to be lightweight and durable for hauling sizable and heavy items. The device is also structured close to the ground so that heavy items need not be lifted, but may be rolled onto the bed of the device, thereby saving the user's back. The device is collapsible for lifting and transporting, and storing in a substantially flattened position. However, the collapsible elements of the invention may be modified by those of skill in the art to carry out the objectives of the invention as described herein. Therefore, reference herein to specific details of the structure and function of the present invention is by way of example only and not by way of limitation.

What is claimed is:

1. A collapsible, hand-operated hauling device for hauling items, comprising:
   a bed having a top surface structured for supporting transportable items, said bed comprising two or more sections that are joined together in a manner enabling the sections to be folded together in a collapsed state of said hauling device, each said section having a top surface which, in combination, form said top surface of said bed for receiving and supporting transportable items;
   at least one handle secured to said bed in a manner enabling said at least one handle to be folded together with said bed into a collapsed state;
   a wheel assembly secured to said bed at a position generally opposite said at least one handle; and
   at least one positioning mechanism secured to one of said sections of said bed and positioned to contact said top surface of the adjoining section and span said top surface of said bed between said adjoining sections of said bed when the hauling device is in a non-collapsed state to securely position and maintain said adjoining sections in adjacent alignment when in a non-collapsed state.

2. The collapsible, hand-operated hauling device of claim 1 further comprising at least one auxiliary handle positioned for lifting said bed when in a collapsed state.

3. The collapsible, hand-operated hauling device of claim 1 further comprising a locking device positioned for securing said at least one handle into a first position for using said hauling device to haul.

4. The collapsible, hand-operated hauling device of claim 3 wherein said locking device is further structured and positioned to secure said at least one handle in position proximate said bed when in a collapsed state.

5. The collapsible, hand-operated hauling device of claim 1 further comprising a frame surrounding said bed.

6. The collapsible, hand-operated hauling device of claim 5 further comprising at least one auxiliary handle positioned along said frame for lifting said hauling device.

7. The collapsible, hand-operated hauling device of claim 1 wherein said bed is comprised of two sections which are pivotally joined together.

8. The collapsible, hand-operated hauling device of claim 7 wherein said at least one handle is pivotally connected to said bed.

* * * * *